United States Patent
Bartucca et al.

(10) Patent No.: US 8,141,061 B2
(45) Date of Patent: Mar. 20, 2012

(54) USING MEMORY KEYS TO DETECT ALIAS VIOLATIONS

(75) Inventors: Francis M. Bartucca, Raleigh, NC (US); Billy R. Robinson, Coppell, TX (US); Punit B. Shah, Portland, OR (US); Carlos P. Sosa, Eagan, MN (US)

(73) Assignee: International Business Machines Corporation, Armonk, NY (US)

( * ) Notice: Subject to any disclaimer, the term of this patent is extended or adjusted under 35 U.S.C. 154(b) by 1467 days.

(21) Appl. No.: 11/558,989

(22) Filed: Nov. 13, 2006

(65) Prior Publication Data

US 2008/0115118 A1 May 15, 2008

(51) Int. Cl.
*G06F 9/45* (2006.01)
(52) U.S. Cl. ........ 717/151; 717/136; 717/140; 717/152; 717/154; 717/156
(58) Field of Classification Search ........................ None
See application file for complete search history.

(56) References Cited

U.S. PATENT DOCUMENTS

| | | | | |
|---|---|---|---|---|
| 5,590,329 | A * | 12/1996 | Goodnow et al. | 717/144 |
| 6,718,542 | B1 | 4/2004 | Kosche et al. | |
| 6,823,507 | B1 * | 11/2004 | Srinivasan et al. | 717/152 |
| 6,880,154 | B2 | 4/2005 | Ghosh et al. | |
| 7,685,570 | B2 * | 3/2010 | Draine et al. | 717/125 |
| 2002/0010911 | A1 * | 1/2002 | Cheng et al. | 717/4 |
| 2003/0005419 | A1 * | 1/2003 | Pieper et al. | 717/141 |
| 2003/0237077 | A1 * | 12/2003 | Ghiya et al. | 717/151 |
| 2004/0010679 | A1 | 1/2004 | Moritz et al. | |
| 2004/0205320 | A1 | 10/2004 | Haugen et al. | |
| 2004/0205740 | A1 * | 10/2004 | Lavery et al. | 717/151 |
| 2004/0268310 | A1 * | 12/2004 | Morgan | 717/124 |
| 2005/0060691 | A1 * | 3/2005 | Das et al. | 717/132 |

OTHER PUBLICATIONS

Aldrich et al., "Alias annotations for program understanding," ACM, Nov. 2002.*
MG Assaad, "Alias-free parameters in C using multibodies," 2001—Citeseer.*
Nguyen, "Alias Verification for Fortran Code Optimization," Journal of Universal Computer Science, 2003, jucs.org.*

* cited by examiner

*Primary Examiner* — Insun Kang
(74) *Attorney, Agent, or Firm* — Yudell Isidore Ng Russell PLLC

(57) ABSTRACT

A compiler utility assigns memory locations to alias-free variables within a computer program. The compiler utility allocates memory keys for the alias-free variables, such that access to the memory locations of the alias-free variables is granted to blocks of code that have knowledge of the memory keys. In response to a command by the user, the compiler generates code to detect violations of alias assumptions during execution of the computer program. During the compiling process, the compiler adds the generated code for detecting violations of alias assumptions to the compiled computer program.

14 Claims, 3 Drawing Sheets

USING MEMORY KEYS TO DETECT ALIAS VIOLATIONS

BACKGROUND OF THE INVENTION

1. Technical Field

The present invention relates in general to the field of computer programming and in particular to compilers. Still more particularly, the present invention relates to an improved method and system for detecting incorrect alias assumptions.

2. Description of the Related Art

Compilers are computer programs that translate text, which is provided by a computer programmer in a source language (also referred to as source code), into a different program language (also referred to as the target language or object code). Compilers thus enable computer programmers to turn a program written in a high level language into an executable low level program capable of being understood by a computer processor.

Conventional compilers perform multiple operations and are capable of supporting various user-defined options in order to optimize the performance of computer program code. One option typically utilized by computer programmers is to assert that no aliases exist for certain variables within the computer program. An alias refers to a variable that when changed, has an indirect and/or unexpected effect on another variable. Aliases typically exist when a programmer utilizes multiple names for the same data location within system memory. Utilizing a compiler option to assert to the compiler that no aliases exist allows the compiler to apply more aggressive code optimization algorithms during the compiling process. However, if any aliases do exist within a program and the programmer has asserted to the compiler that aliases do not exist, then incorrect behavior (e.g. runtime errors) can occur when the compiled program is executed.

SUMMARY OF THE INVENTION

In one embodiment, memory locations are assigned to alias-free variables, within a computer program. Memory keys are assigned to the alias-free variables, such that access to the memory locations of the alias-free variables is granted to blocks of code that have knowledge of the memory keys. In response to a command by the user, a compiler generates code to detect violations of alias assumptions during execution of the computer program. During the compiling process, the generated code for detecting violations of alias assumptions is added to the compiled computer program.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method, system, and computer program product for detecting incorrect alias assumptions.

Figure 1:
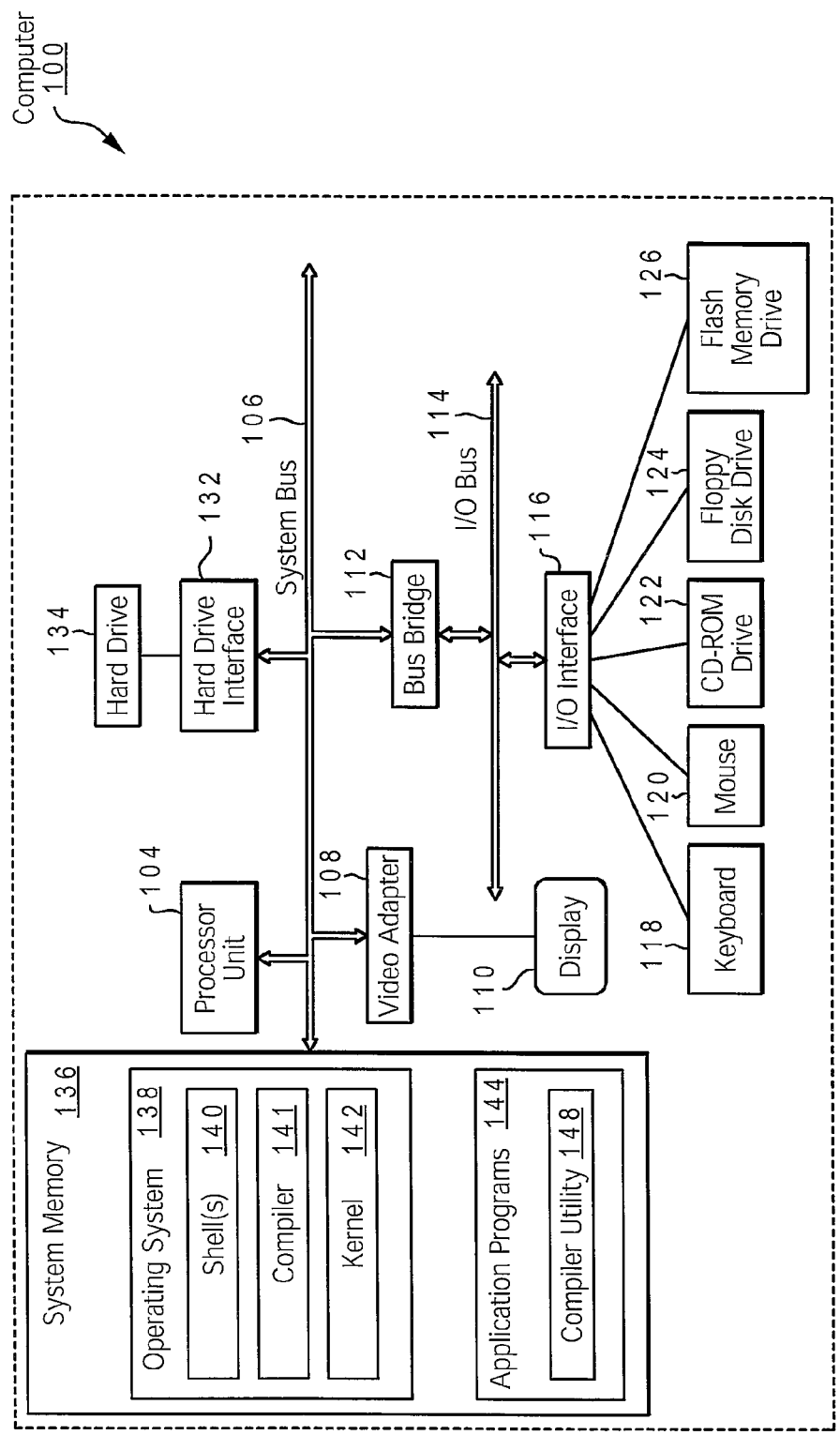
FIG. 1 depicts a high level block diagram of an exemplary data processing system, as utilized in an embodiment of the present invention.

With reference now to FIG. 1, there is depicted a block diagram of an exemplary computer 100, with which the present invention may be utilized. Computer 100 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. I/O interface 116 is coupled to I/O bus 114. I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

A hard drive interface 132 is also coupled to system bus 106. Hard drive interface 132 interfaces with a hard drive 134. In a preferred embodiment, hard drive 134 populates the system memory 136, which is also coupled to system bus 106. System memory is defined as a lowest level of volatile memory in computer 100. This volatile memory may include additional higher levels of volatile memory (not shown), including, but not limited to, cache memory, registers, and buffers. Code that populates system memory 136 includes an operating system (OS) 138 and application programs 144.

OS 138 includes a shell 140, for providing transparent user access to resources such as application programs 144. Generally, shell 140 (as it is called in UNIX®) is a program that provides an interpreter and an interface between the user and the operating system. More specifically, shell 140 executes commands that are entered into a command line user interface. Thus, shell 140, also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and mouse and keyboard management. OS 138 also includes a compiler 141 that is utilized by users of computer 100 to transform high level source code into executable (i.e. executable) object code. In an alternate embodiment, compiler 141 may be included in application programs 144.

Application programs 144 in system memory 136 also include a compiler utility 148. In one embodiment, compiler utility 148 performs the steps illustrated in FIGS. 2-3, which are discussed below. Although illustrated as a single component, in some embodiments compiler utility 148 may be formed of multiple software components.

The hardware elements depicted in computer 100 are not intended to be exhaustive, but rather represent and/or highlight certain components that may be utilized to practice the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention.

Figure 2:
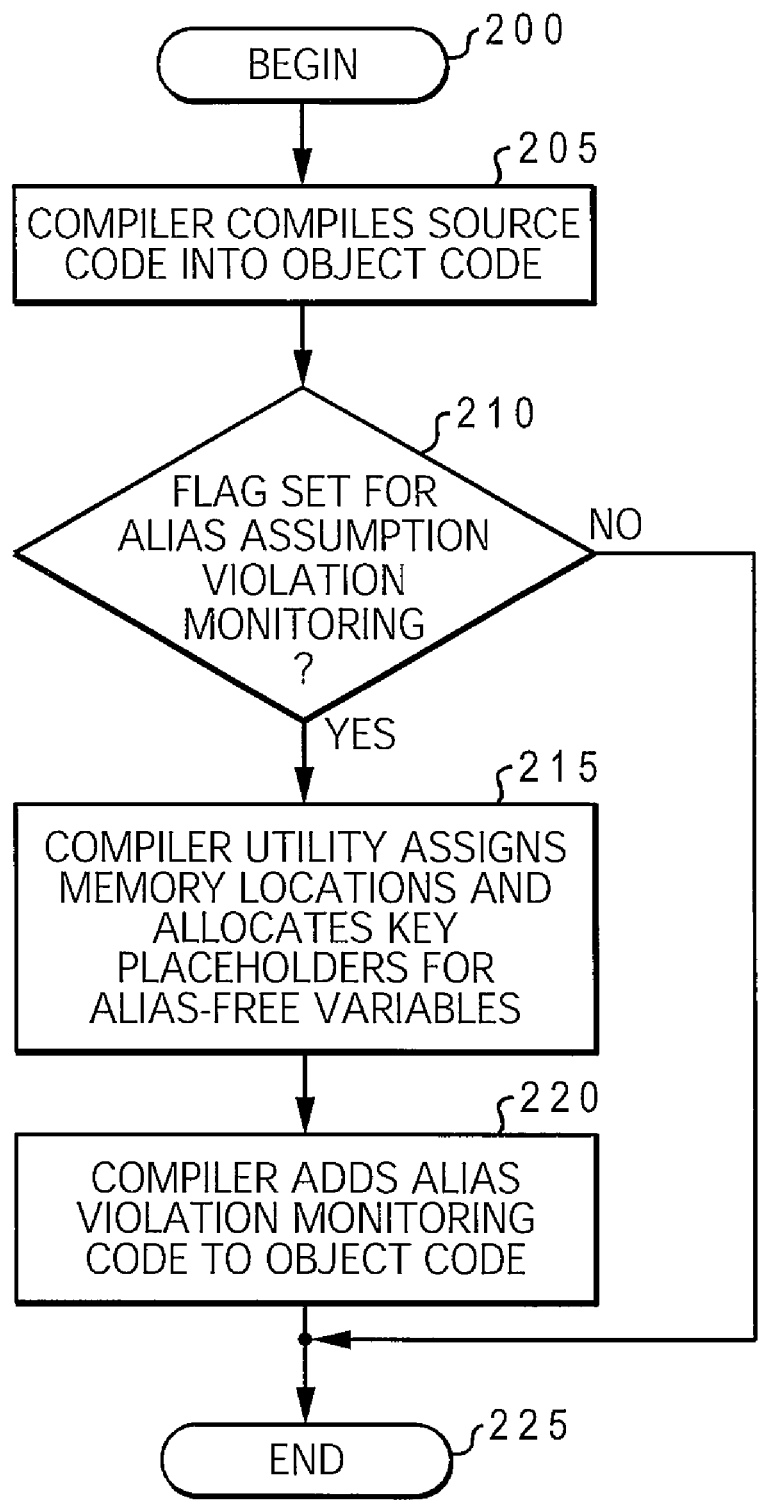
FIG. 2 is a high level logical flowchart of an exemplary method of compiling computer program code in accordance with one embodiment of the invention.
Figure 3:
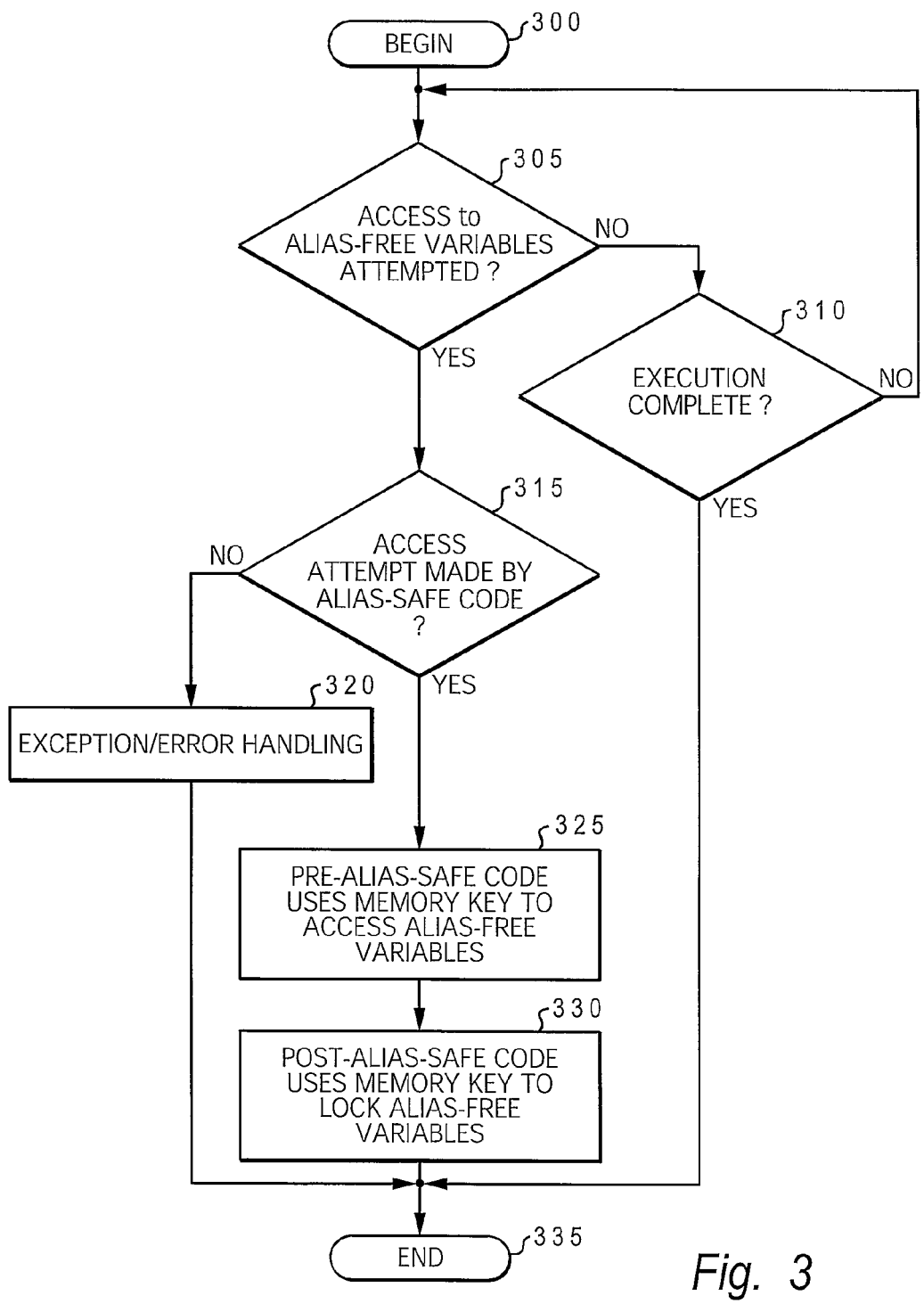
FIG. 3 is a high level logical flowchart of an exemplary method of detecting incorrect alias assumptions during the execution of program code in accordance with one embodiment of the invention.

With reference now to FIG. 2, there is illustrated a high level logical flowchart of an exemplary method of compiling computer program code, according to an embodiment of the present invention. The process begins at block 200, in response to a user of computer 100 initiating compiler 141. Compiler 141 compiles the source code provided by the user and generates object code corresponding to the source code, as depicted in block 205. A determination is made by compiler utility 148 whether a user of computer 100 has set a flag for alias assumption violation monitoring, as shown in block 210. An alias assumption is defined as an assertion by a user that the source code does not contain aliases for one or more variables. Alias assumption violation monitoring is illustrated in FIG. 3, which is described below. If a flag has not been set for alias assumption violation monitoring, the process terminates at block 225.

In response to a determination that a user of computer 100 has set a flag for alias assumption violation monitoring, compiler utility 148 assigns memory locations to the user-defined alias-free variables within the program code and allocates memory key placeholders corresponding to the alias-free variables, as depicted in block 215. An alias-free variable is defined as a variable that a user of computer 100 has defined as not having any aliases. A memory key placeholder is defined as an internal variable generated by compiler 141 that associates an alias-free variable with a block of code that is eligible to access a specific location within system memory 136 and/or a specific register (not shown) within processor unit 104 that corresponds to an alias-free variable. According to the illustrative embodiment, compiler utility 148 prompts compiler 141 to generate multiple memory keys that each correspond to the location within system memory 136 and/or register within processor unit 104 where an alias-free variable is stored. In an alternate embodiment, a memory key placeholder may not be an internal variable, but may instead be a unique name visible to a programmer in a compiler generated listing.

Compiler 141 adds alias violation monitoring code to the object code during the compiling process, as depicted in block 220. The alias violation monitoring code enables operating system 138 to generate a memory key value when memory locations are allocated for an alias-free variable during the execution of the compiled code (i.e., at run time). The compiling process then terminates at block 225. During run time, the alias violation monitoring code also performs the process illustrated in FIG. 3, which is discussed below.

Turning now to FIG. 3, there is illustrated a high level logical flowchart of an exemplary method of detecting incorrect alias assumptions during the execution of program code in accordance with one embodiment of the invention. The process begins at block 300 in response to a user of computer 100 executing a compiled computer program. A determination is made by compiler utility 148 whether the computer program has attempted to access an alias-free variable, as depicted in block 305. If the computer program has not attempted to access an alias-free variable, a decision is made whether the execution of the computer program is complete, as shown in block 310. If the execution of the computer program is complete, the process terminates at block 335. If the execution of the computer program is not complete, the process returns to block 305. In an alternate embodiment, at a time before the execution of a block of compiled code, during the execution of the code, or during debugging of the code, a user of computer 100 may enable or disable the detection of alias violations for all alias-free variables. In another embodiment, a user may enable or disable the detection of alias violations on a per-variable basis.

In response to a determination that the computer program has attempted to access an alias-free variable, a decision is made whether the access attempt was made by a block of alias-safe code, as depicted in block 315. Alias-safe code is defined as code within a computer program that is authorized to access alias-free variables. If the access attempt was made by a block of code that is not alias-safe code, compiler utility 148 halts the execution of the computer program, notifies the user that an alias assumption violation was detected, and initiates exception/error handling processes, as shown in block 320. The process then terminates at block 335 in order to allow the user to debug the computer program.

In an alternate embodiment, at a time before the execution of a block of compiled code, during the execution of the code, or during debugging of the code, a user of computer 100 may enable or disable the capability of compiler utility 148 to halt the execution of a block of code upon the detection of alias violations for all alias-free variables. In another embodiment, a user may enable or disable the capability of compiler utility 148 to halt the execution of a block of code upon the detection of alias violations on a per-variable basis. In yet another embodiment, at a time before the execution of a block of compiled code, during the execution of the code, or during debugging of the code, a user of computer 100 may enable or disable the capability of compiler utility 148 to count alias violations globally or on a per variable basis.

Returning now to FIG. 3, in response to a determination that the access attempt was made by an alias-safe block of code, pre-alias-safe code utilizes a memory key to unlock the location within system memory 136 and/or registers within processor unit 104 that corresponds to the alias-safe variable and to access the alias-safe variable, as depicted in block 325. Pre-alias-safe code is defined as code that is executed before alias-safe code (i.e., at an entry point). Once the alias-safe variable has been accessed (i.e., at an exit point), post-alias-safe code utilizes a memory key to lock the location within system memory 136 and/or registers within processor unit 104 that corresponds to the alias-safe variable, as shown in block 330. The process then terminates at block 335. The pre-alias-safe code and post-alias-safe code are thus thread safe and/or re-entrant, such that when executed in the correct order, the code enables access to alias-free variables to be controlled in a threaded execution environment.

In an alternate embodiment, a debug program can be enhanced to recognize exceptions generated by illegal accesses to alias-free variables protected by memory keys and to provide formatted information to a user in order to aid in the debugging process. Similarly, special features and/or libraries can be added to a debug program to facilitate the implementation of commands and/or interfaces between the debug program and the alias violation detection code.

The present invention thus enables a compiler utility to assign memory locations to alias-free variables, which a user asserts do not have aliases, within a computer program. The compiler utility assigns memory keys to the alias-free variables, such that access to the memory locations of the alias-free variables is granted to blocks of code that have knowledge of the memory keys. In response to a command by the user, the compiler generates code to detect violations of alias assumptions during execution of the computer program and adds the code for detecting violations of alias assumptions to the compiled program code. In one embodiment, memory locations within system memory 136 are assigned to the alias-free variables in response to a flag set by the user. In another embodiment, the memory locations are registers within processor unit 104. A user selectively controls the detection of alias assumption violations, and the detection of any alias assumption violations results in the initiation of an exception process, such that the user is notified and can debug the program code. The memory keys are code generated by the compiler. In one embodiment, the blocks of code that have knowledge of the memory keys include code that is executed to access the memory locations and code that is executed to secure the memory locations.

It is understood that the use herein of specific names are for example only and not meant to imply any limitations on the invention. The invention may thus be implemented with different nomenclature/terminology and associated functionality utilized to describe the above devices/utility, etc., without limitation.

While an illustrative embodiment of the present invention has been described in the context of a fully functional computer system with installed software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as thumb drives, floppy disks, hard drives, CD ROMs, DVDs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of detecting incorrect alias assumptions in compiled program code, the method comprising:
   determining if a flag for alias assumption violation detection is set;
   in response to the flag being set, assigning by a processor unit storage locations to variables of a computer program designated to a compiler as alias-free variables that are asserted as not having aliases;
   assigning by the processor unit a respective memory key placeholder to each of the alias-free variables in the computer program;
   generating by a compiler memory keys of the memory key placeholders that each corresponds to the storage locations of the alias-free variables such that access to the storage locations of the alias-free variables is granted to blocks of code in the computer program that have knowledge of the memory keys; and
   in response to a command, executing by the processor unit the compiler to selectively generate code to detect violations of alias assumptions during execution of the computer program and to add the generated code to the computer program.

2. The method of claim 1, wherein the storage locations include a storage location within a system memory of a computer.

3. The method of claim 1, wherein the storage locations include a processor register within a computer.

4. The method of claim 1, wherein the memory key placeholders are computer code generated by the compiler.

5. The method of claim 1, and further comprising:
   in response to an alias assumption violation during execution of the compiled computer program, executing an exception process that provides user notification of the alias assumption violation.

6. The method of claim 1, wherein the blocks of code that have knowledge of the memory keys include blocks of code executed to access the storage locations and blocks of code executed to secure the storage locations.

7. A data processing system comprising:
   a processor unit;
   data storage coupled to the processor unit;
   a compiler within the data storage and executable by the processor to generate compiled program code; and
   wherein the compiler is configured to:
      using a compiler utility, determine if a flag for alias assumption violation detection in a computer program is set;
      in response to the flag being set, assign storage locations to variables of the computer program designated to the compiler as alias-free variables that are asserted as not having aliases, assign a respective memory key placeholder to each of the alias-free variables in the computer program, generate memory keys of the memory key placeholders that each corresponds to the storage locations of the alias-free variables such that access to the storage locations of the alias-free variables is granted to blocks of code in the computer program that have knowledge of the memory keys, and in response to a command, selectively generate code to detect violations of alias assumptions during execution of the computer program and add the generated code to the computer program.

8. The data processing system of claim 7, wherein the compiler utility is separate from the compiler.

9. The data processing system of claim 7, wherein the compiler utility is included within the compiler.

10. A program product, comprising:
    a computer-readable storage device; and
    program code stored within the computer-readable storage device that, when executed, causes a data processing system to perform:
       determining if a flag for alias assumption violation detection is set;
       in response to the flag being set, assigning storage locations to variables of a computer program designated to a compiler as alias-free variables that are asserted as not having aliases;
       assigning a respective memory key placeholder to each of the alias-free variables in the computer program;
       generating by a compiler memory keys of the memory key placeholders that each corresponds to the storage locations of the alias-free variables such that access to the storage locations of the alias-free variables is granted to blocks of code in the computer program that have knowledge of the memory keys; and
       in response to a command, executing the compiler to selectively generate code to detect violations of alias assumptions during execution of the computer program and to add the code to detect violations of alias assumptions to the compiled computer program.

11. The program product of claim 10, wherein the storage locations include a storage location within a system memory of the data processing system.

12. The program product of claim 10, wherein the storage locations include a processor register within the data processing system.

13. The program product of claim 10, wherein the memory key placeholders are computer code generated by the compiler.

14. The program product of claim 10, wherein the blocks code having knowledge of the memory key placeholders include blocks of code executed to access the storage locations and blocks of code executed to secure the storage locations.

* * * * *